United States Patent
Ferraro et al.

(10) Patent No.: US 7,078,831 B2
(45) Date of Patent: Jul. 18, 2006

(54) SYSTEM FOR CORRECTING POWER FACTOR AND HARMONICS PRESENT ON AN ELECTRODUCT IN AN ACTIVE WAY AND WITH HIGH-DYNAMICS

(75) Inventors: Vincenzo Ferraro, Rende (IT); Emilio Ferraro, Rende (IT)

(73) Assignee: EDP S.R.L., Cosenza (IT)

( * ) Notice: Subject to any disclaimer, the term of this patent is extended or adjusted under 35 U.S.C. 154(b) by 0 days.

(21) Appl. No.: 10/416,633

(22) PCT Filed: Nov. 19, 2001

(86) PCT No.: PCT/IT01/00577

§ 371 (c)(1),
(2), (4) Date: Sep. 22, 2003

(87) PCT Pub. No.: WO02/41463

PCT Pub. Date: May 23, 2002

(65) Prior Publication Data

US 2004/0046531 A1    Mar. 11, 2004

(30) Foreign Application Priority Data

Nov. 17, 2000    (IT) .......................... CZ2000A0008

(51) Int. Cl.
H02J 1/02       (2006.01)
(52) U.S. Cl. .................................................. 307/105
(58) Field of Classification Search ................ 323/207;
363/41, 39; 307/105
See application file for complete search history.

(56) References Cited

U.S. PATENT DOCUMENTS

| | | | |
|---|---|---|---|
| 4,811,236 A | | 3/1989 | Brennen et al. |
| 4,961,130 A | * | 10/1990 | Kirchberg, Jr. .............. 363/41 |
| 5,982,645 A | * | 11/1999 | Levran et al. ................ 363/37 |
| 6,014,017 A | * | 1/2000 | Weinhold et al. ........... 323/207 |
| 6,088,245 A | | 7/2000 | Ainsworth |
| 6,300,723 B1 | * | 10/2001 | Wang et al. ................. 315/247 |
| 6,348,778 B1 | | 2/2002 | Weinhold et al. |

FOREIGN PATENT DOCUMENTS

| | | |
|---|---|---|
| DE | 3429116 A1 * | 2/1986 |
| DE | 197 37 590 C1 | 10/1998 |

* cited by examiner

Primary Examiner—Shawn Riley
(74) Attorney, Agent, or Firm—Michael J. Striker (57) ABSTRACT

An electric control system for a pulse width modulated inverter connected in parallel to an electricity distribution network for correcting or minimizing a voltage total harmonic distortion of the distribution network includes a sampler of the voltage of the electricity distribution network for obtaining samplings of the distribution network. The sampler preferably is an analog-to-digital converter. The system also includes a phase locked loop circuit that supplies a phase value of a period under examination, and a storage system for coupling the various samplings with the phase value obtained by the phase locked loop circuit.

3 Claims, 7 Drawing Sheets

FIG. 6  Table "E": DESCRIPTION OF THE PROTOTYPE CONFIGURED AS A GENERATOR

Table "F": DFT DEVELOPMENT WITH MASKS CONTAINING PRE-MEMORIZED CALCULATIONS

STEP 1: real and imag matrix reading real=C*cos(K*2*(PiGreco/NumSamp)*P)   imag=C*sin(K*2*(PiGreco/NumSamp)*P)

STEP 2: execute summation real (0 -:- LINT) and imag (0 -:- LINT) (for P= 0 -:- N)

STEP 3: Square root matrix reading

Legend
C - Sample Values of the input sequence +/- (0 - NumSamp)
P - External loop index - harmonic number (0 - N)
K - Internal loop index (0 -LINT)

*FIG. 7*

SYSTEM FOR CORRECTING POWER FACTOR AND HARMONICS PRESENT ON AN ELECTRODUCT IN AN ACTIVE WAY AND WITH HIGH-DYNAMICS

BACKGROUND OF THE INVENTION

The standard concept of PFC (Power Factoring Correction), has been for years concerned with the phase shift between voltage and current, since this parameter developed besides the Real Power (measured in Watt), a Reactive Power (measured in VAR); a kind of power that, although didn't use energy, it increased the total current carried on the power line, engaging more generators and all intermediate equipments (step up and step down transformers, etc.).

Figure 1:
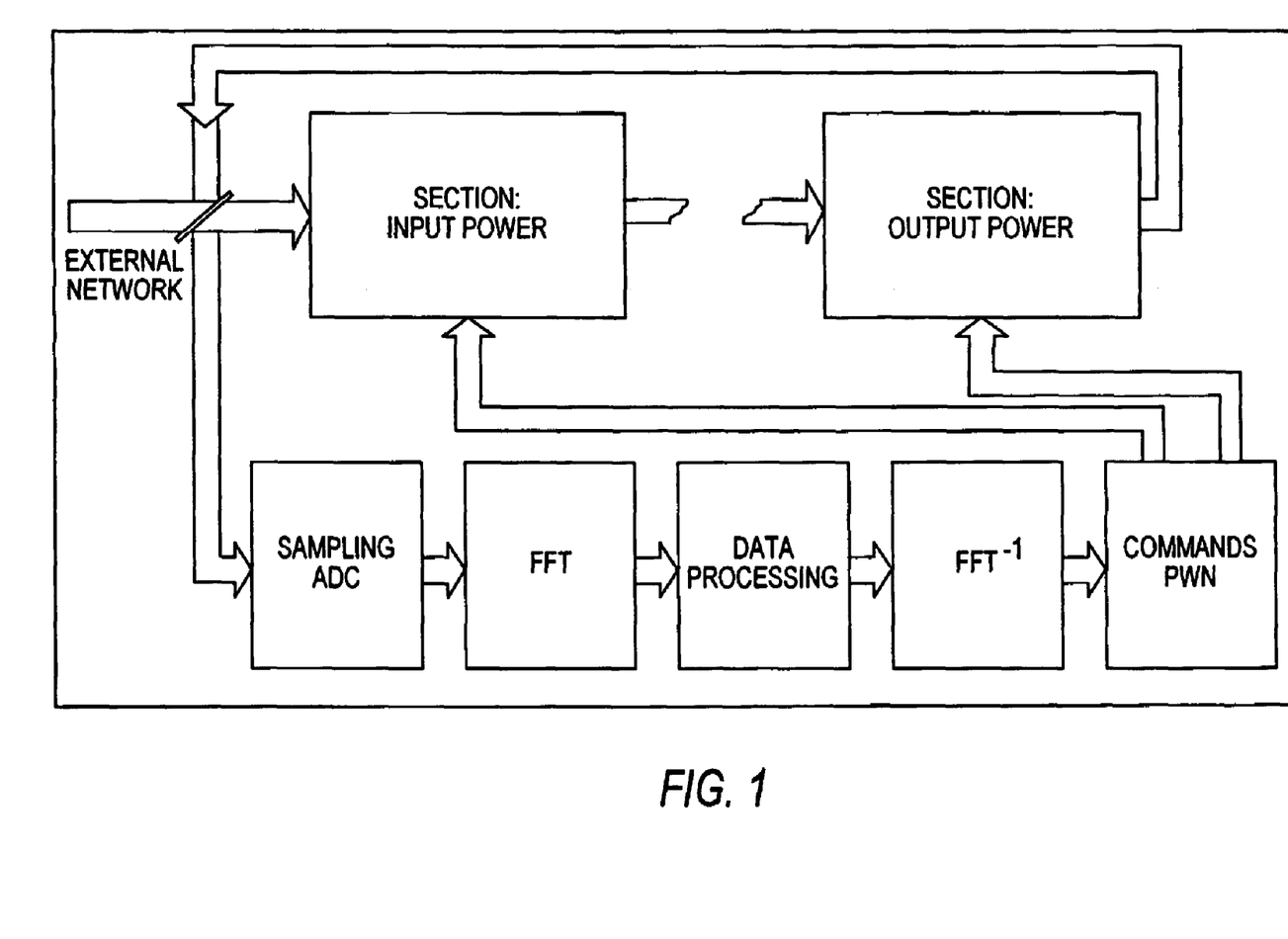
FIG. 1 is a view schematically showing an electric control system in accordance with the present invention.
Figure 2:
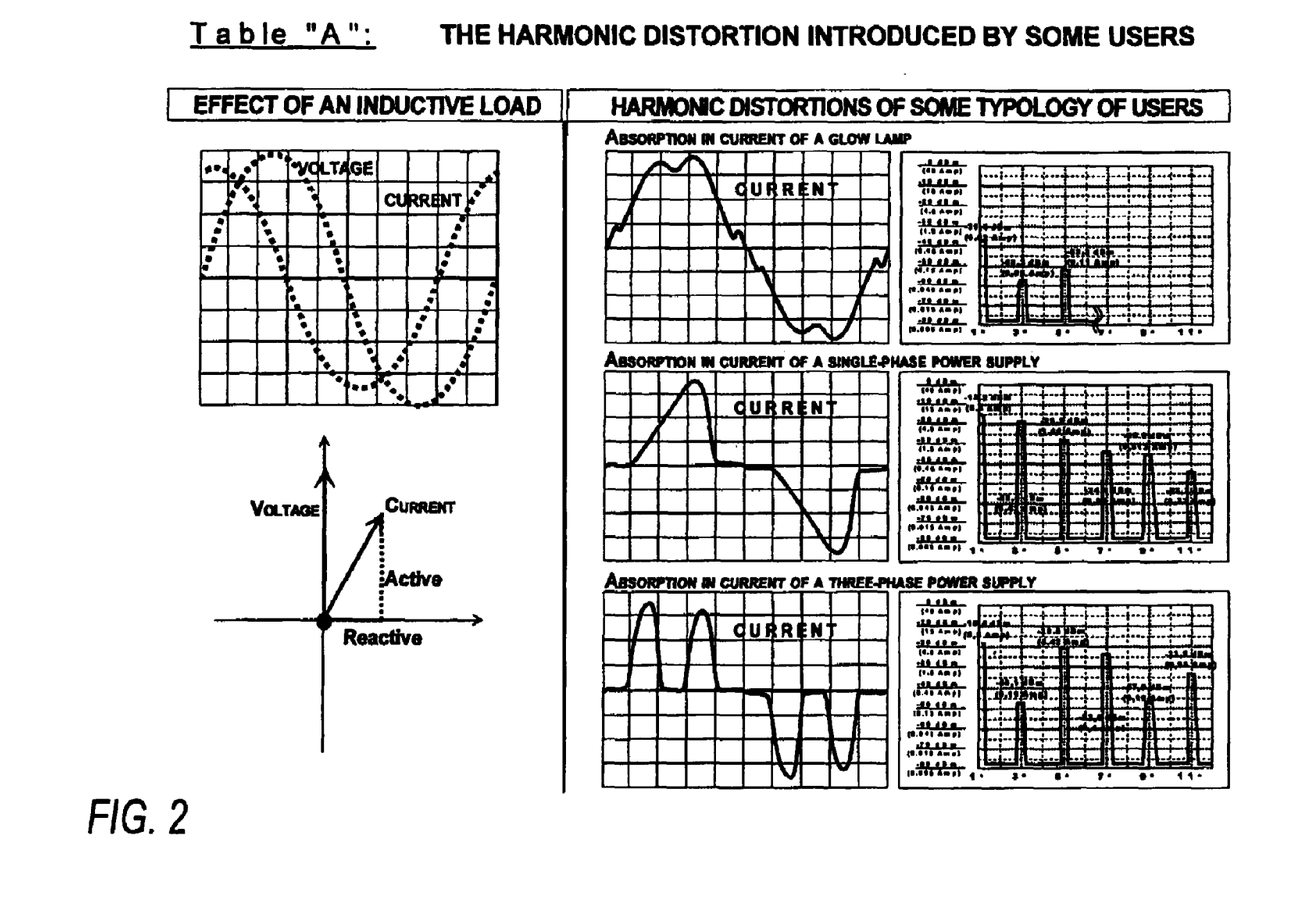
FIG. 2 is a view illustrating a harmonic distortion introduced by some users.

However, the problem was immediately solved, because it was caused by a reactive component of inductive nature (see Table-A—Sec. Effect of an Inductive Load), which was easily compensated by a reactive component of the same value, out of phase in inverse nature (capacitive), connected to the user end (power factor correction of the system).

The users with a typology of nonlinear current absorption, considerably help to modify, this "normal" functional condition, lacking in harmonic distortions (therefore easily resolvable); three classic examples are:

Gas-discharge lamps;
Partial loads on each phase (with SCR/TRIAC controls);
power supply, generally.

Therefore, there is a group of users, connected to the distribution network, whose real problem of correction, is not to introduce a phase shift between voltage and current (a problem easy to solve), but to introduce, on the network itself, a large quantity of harmonics, which the users connected produces in intrinsic mode.

Table-A in the Sec. "Harmonic Distortions for some kind of users", points out exactly some loads with this kind of problem. The table shows, for each one of them, both the graph of the current, and the quantization of its more considerable harmonics (analysis in the time-and-frequency-domain); the cases described are:

a neon glow lamp (the phenomenon is similar for all gas-discharge lamps)
a typical single-phase power pack (without PFC);
a typical three-phase power pack (without PFC).

Figure 3:
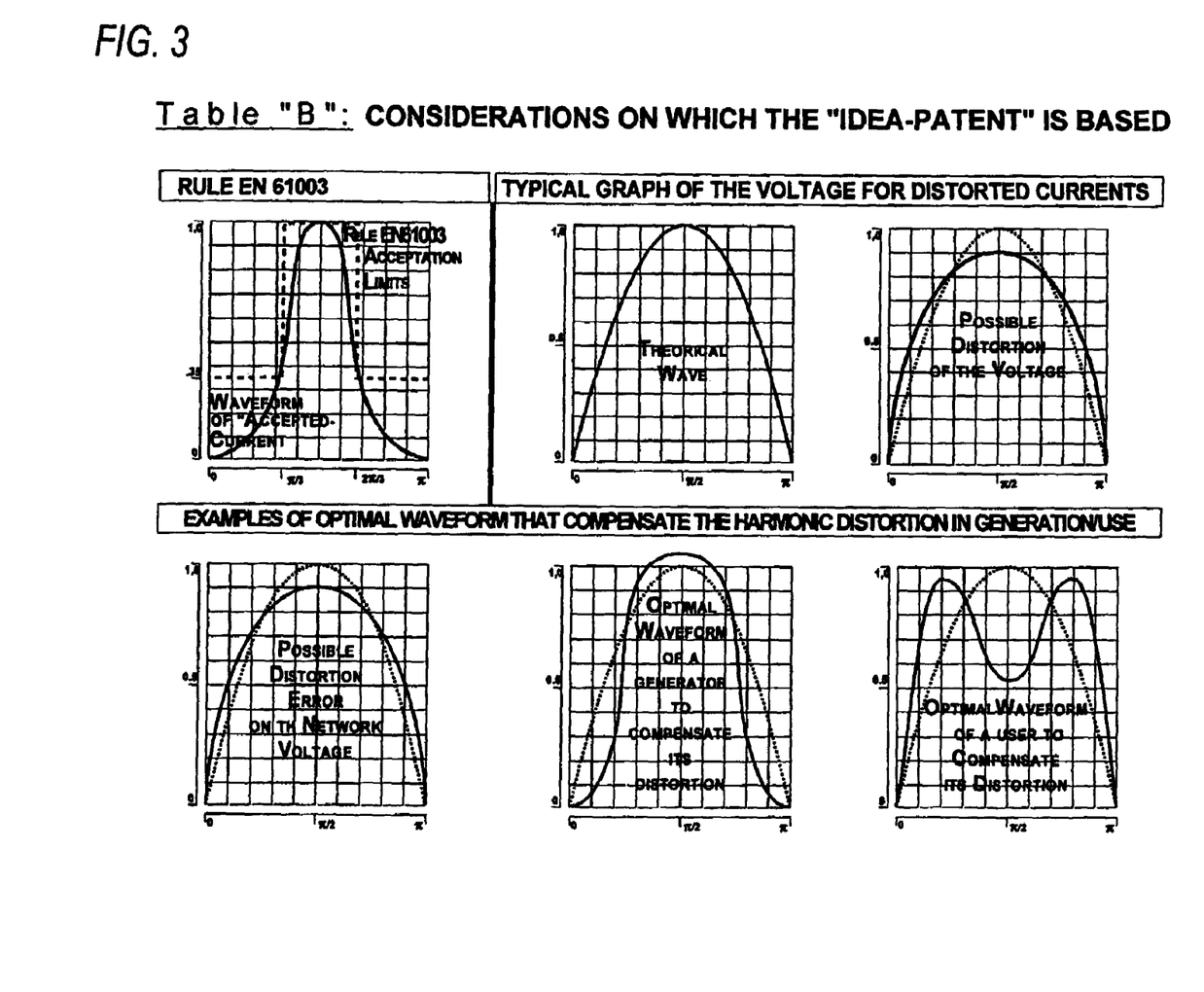
FIG. 3 is a view illustrating considerations on which the system in accordance with the present invention is based.

That is, of course, a serious problem they tried to reduce through several rules; in Europe, for instance, Rule no EN-61003 Is in force. Its limits (under particular conditions of power/use) are reported in Table-B—Sec. Rule EN61003.

Therefore the cited rule doesn't succeed in solving the problem, but it can only reduce its extent. And, as electronics-of-energy-conversion becomes more and more competitive (motor controls with VVVF systems, Energy-Conversion with PWM technique), and, consequently, the number of harmonics introduced on the network rises up, the same problem expands, and the "Quality of the Waveform Supplied to the User" is more and more reduced (see Table B—Sec. "Typical graph of the voltage for distorted currents").

The present invention is based on the following concerns:
the production of alternative electric energy of small/medium power, integrated on the feeding external network;
the conversion/use of energy with PWM technique systems. Therefore, the problem exits (see Table-B —Sec. "Examples of optimal waveforms that compensate the harmonic distortion in generation/use") of establishing whether it is advantageous/useful, to a generator/user not to operate with sinusoidal currents, but with exactly distorted currents, able to correct the harmonic distortions on the network.

Our project is able to:
supply, on the concerned distribution tracts, and with all the advantages this produces, a "qualitatively" better energy.
give to the alternative-energy converters (working with PWM technique), also a correcting/improvement factor in the waveform's quality, for the power line to which they are connected;
improve the performances of the users (working with PWM technique), so that they are no more the cause of wave distortion, but of the correction/improvement of the wave itself.

Table-B—Sec. "Examples of optimal waveforms that compensate the harmonic distortion in generation/use"), describes, in a preliminary way (later on, we'll face the technical point of view), how that can be realized, in fact:

the first graph shows an half cycle of voltage, with a typical wave's distortion, pointing out the error which characterizes it, compared with the theoretical value it should have;
the second graph shows the optimal distortion a generator should have, when, connected to a power line, it has to mitigate the harmonic distortions on the power line itself. In that case, as it is described in the graph, it should generate a small energy on the lower values of the sinusoid, and concentrate it on the higher amplitudes, exactly where the waveform is lowered;
finally, the third graph shows the optimal distortion a user should have when, connected to a power line, it has to mitigate the harmonic distortions that are on the power line itself. In that case, as the graph points out, it should absorb a great deal of energy on the low values of the sinusoid, and reduce it on the higher amplitudes, exactly where the waveform is lowered;

SUMMARY OF THE INVENTION

Figure 4:
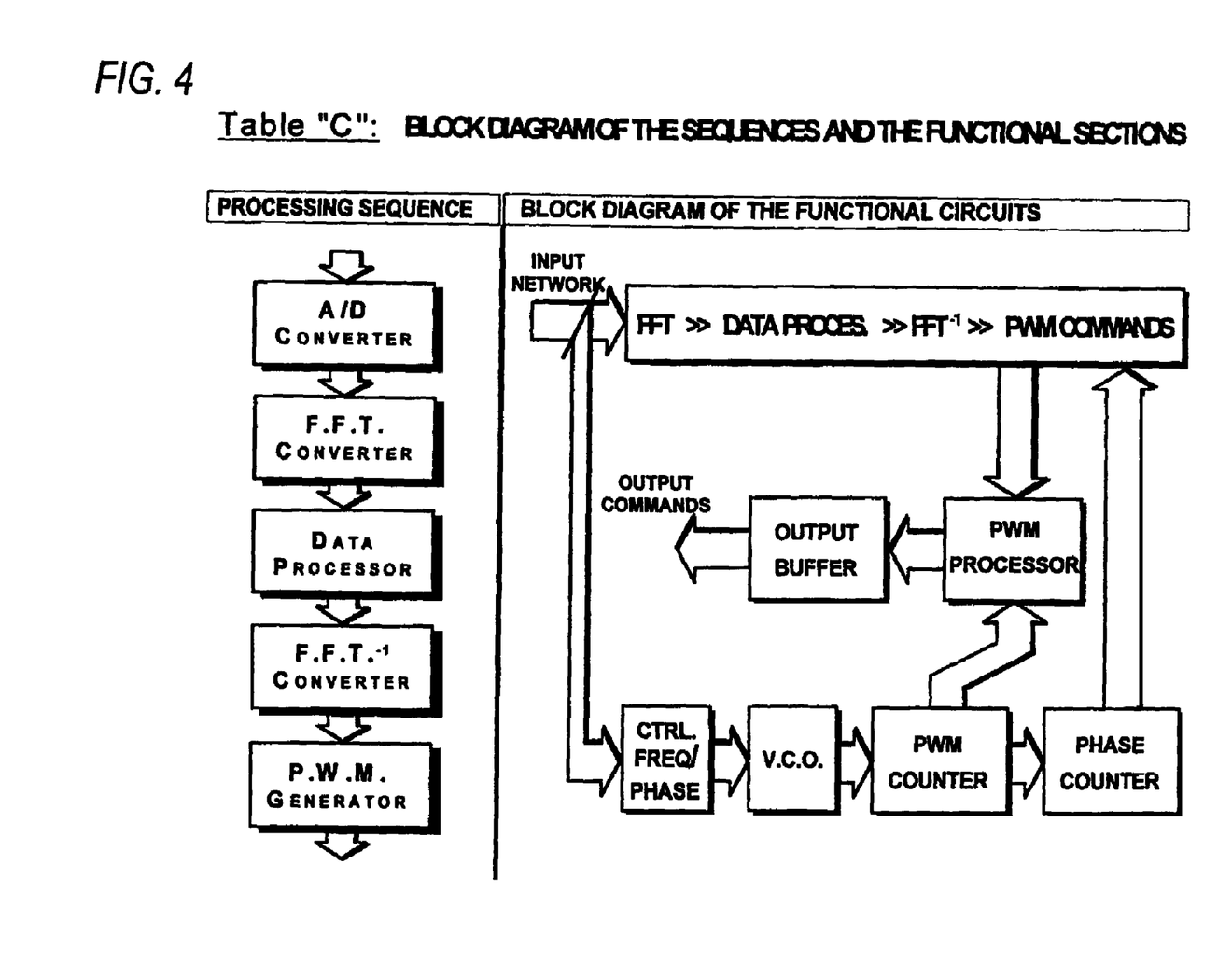
FIG. 4 is a view showing a block diagram of sequences and functional sections of the system in accordance with the present invention.

This section describes how the device architecture is structured, to transform the "idea-patent" into an "industrial-product"; is implied a series of processes summed up as follows:

A. First of all, so that "a-part" of the harmonics on the network can be compensated in an optimal and automatic way, they have to be transformed in measurable-parameters;

B. As it is shown in Table-C, an analog-to-digital converter, followed by a FFT converter (Fast Fourier Transform), provides for this task;

C. Now, the system transports the parameters in the frequency-domain, and analyzes/elaborates the parameters, considering:

The harmonic corrections already carrying out;
The power that can be used as generator/user;
The value of the voltage in output/input stage (depending on whether it works as generator or user); and establishing which is the best functional performance, with reference to the specific condition of functional dynamics progressing;

D. After that, the device translates again the various elaborations in the time-domain, through a conversion that uses the "anti-Fourier-transform";

E. Last action to do, is the arrangement of the data, transferred in the "time-domain", in signals useful to drive the PWM power converter, in order to realize, on the external network, the appropriate programmed correction.

F. Table-C besides presenting, in Sec. "Processing Sequence", the process of the events/processings, as it has been described earlier, It presents, In Sec. "Block diagram of functional circuits", the block diagram of electronic circuits, which realize the different processes. What characterizes these circuits, as Table-C points out, is:

G. A Frequency/Phase control system, in order to generate commands properly related to the external network;

H. A VCO (Voltage Controlled Oscillator), in order to generate a frequency synchronized to the network, but of a much more high value, thus coordinating/controlling the PWM process coming into effect;

I. A PWM-Counter, followed by a Counter-PHASE, in order to correlat the PWM command with that of the phase, and work at high stability (low-Jitter);

J. A FFT processor, connected to a section that elaborates/optimizes the various parameters of harmonic distortion, followed by an FFT-1 processor, completed with a command translator in PWM (in a short time, we will analyze in detail this circuit);

K. A PWM processor which translates the command parameters into pulse amplitudes, already arranged;

L. An output buffer which boosts/arranges the right command for the power sections.

Now, we pay attention to the circuit described at the "Point-I", considering how it works, and its own peculiarities; besides, in the description, we point out the analysis that the circuit executes, when it controls a system which produces energy; it stands to reason that the utilization of this circuit on a users that needs to be supplied with energy (load), reverses the sum/subtraction parameters.

Figure 5:
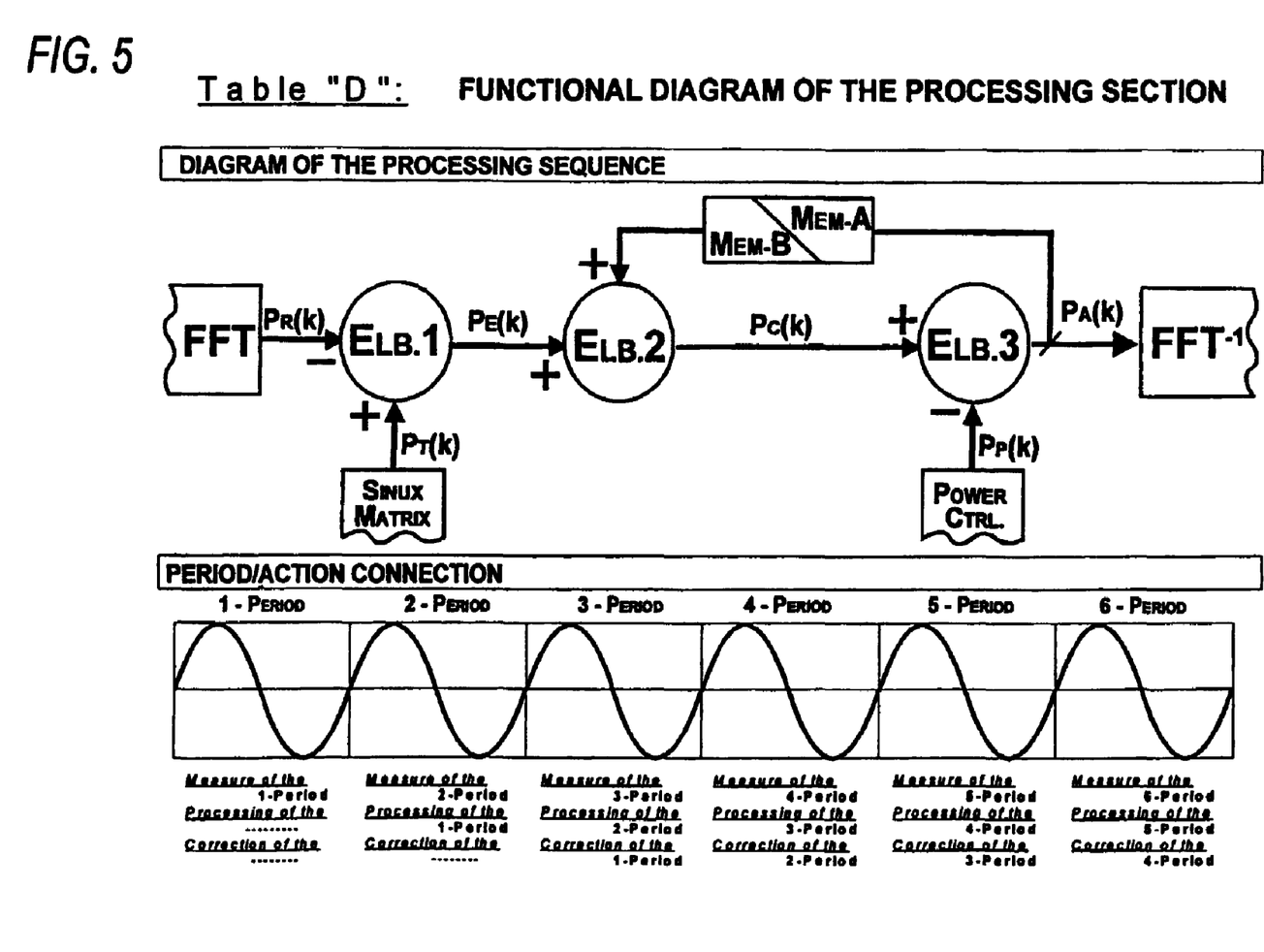
FIG. 5 is a view showing a functional diagram of a processing section of the system in accordance with the present invention.

The block defined as "FFT/DATA PROCESSING/FFT-1/PWM" works according to the Processing-Sequence described In Table-D, that we can point out as follows:

1. The input voltage, sampled by an analog-to-digital converter, that is, in its turn, controlled by a PLL system (Phase Locked Loop—in order to obtain a perfect phase lock), is transformed into a series of digital data, whose acquisition times are perfectly calibrated and correlated to the period itself.

2. The conversion data of the point 1, are sent to a FFT processor (Fast-Fourier-Transform), which executes their translation from the "time-domain" to the "frequency-domain".

Therefore we obtain the discrete spectrum of the network signal, indicated as Pr(k) In the diagram.

3. Now Pr(k) undergoes the first processing in Elb.1. The aim of this processing, is to test "how-much" the discrete spectrum of the network signal Pr(k), is different from the discrete spectrum of the theoretical signal Pt(k).

Therefore we obtain the discrete spectrum of the error signal, indicated as Pe(k) in the diagram.

4. This error signal (which refers to the previous p riod), indicated as Pe(k) comes to the Elb.2. Here it undergoes a correlation processing, realized comparing the error that is still on the network (Pe(k)), with the correction (Mem-B) that the device executed on the network itself at the time of the sampling we are considering (i.e. the previous period).

The Elb.2processing Is essential for the system convergence towards a situation of optimal energetic generation. It has to execute the next final processing, "considering" that the measurement result, which undergoes the Pr(k) analysis, is not a "neutral" result, but a result obtained "also" thanks to the energy contribution of this device, which has a parallel programming on the network, and boosts a kind of energy/correction, we have to consider before establishing the following executive commands; thus a processing which allows to:

Connect the device in parallel to other networks, knowing not the ratio between its own part of energy contribution and the total system; therefore, it can function by itself, or connected in parallel to generators with a much more big power than its maximum. Even so, the device has no difficulties in quickly and accurately "converging" towards its optimal condition of generation.

Delete all the problems that the distribution of the electric lines involves: line resistances, greater/smaller closeness of perturbation loads, etc.; the system, exactly because correlates what it dynamically measures with the executed corrective-action (parameters stored in the memory), is always able to make an action immediately corrected, without proceeding in "step of successive approximation"; thus it realizes an excellent operating dynamics. Obviously, so that the device can properly operate, it is necessary for it to store the command data, in order to carry out their subsequent evaluation; this circuit section, indicated as Mem-A & Mem-B in the diagram, is realized with a Shift-Memory system, that stores the command data, and translates them of a period, supplying the Elb-2 processing with them.

Therefore we obtain the discrete spectrum of the correction system, Indicated as Pc(k) in the diagram.

5. However, the Pc(k) signal is still not utiilizable as actuator command to send to the FFT-1 (described afterwards); in fact, if the system had only these controls, it could reach operating circumstances/commands of "breakdowns"; and here the term "breakdown" has to be interpretated in a very wide sense, for example:

In the attempt of making the maximum harmonic correction, the system could give an executive command higher than its own maximum generable power.

In the attempt of generating the maximum available power, it could increase the voltage of the inverter DC/AC up to supply the user with a voltage higher than the acceptance standards.

The processing section (Elb-3), that works comparing the Pc(k) signal with the Pp(k) signal, provides for that.

The Pp(k) signal is a complex signal, which contains the whole of "limits" that the device has to fulfil in its functional cycle. Some of these limits are attached to the hardware (maximum generable power, the maximum energetic peak that can be supplied, etc.), some are attached to the standards (maximum voltage, operating frequency, etc,), others to the operating dynamics (maximum available eolian energy, maximum available photovoltaic energy, etc.).

Getting out from Elb-3 one finally obtains the discrete spectrum of the fulfillment signal, indicated as Pa(k) In the diagram; a spectrum which is also acquired by "Mem-A" to update the memory "Mem-B" towards the subsequent processings.

6. The discrete spectrum of the Pa(k) signal, Is now sent to the FFT-1 processor (Inverse-Fast-Fourier-Transform), which takes us back from the "frequency-domain" to the "time-domain". Therefore, we will have a sequence of signals, getting out from the FFT-1, that, appropriately correlating with the PLL sequencies, and after a section of matching/development (Output Buffer), gives the corrected command signal, that has to be sent to the PWM power circuit (Pulse Width Modulation).

This method allows to operate:

Under a circumstance of total absence of oscillations; in fact, each period is generated by a processing which analizes it in its overall parameters;

In a total automatic mode, thus able to "auto-converge" towards the optimal operating condition, and under any circumstance of use (whether it in single programming, or connected in parallel to big generators);

With an excellent cost/performance ratio. It can, in fact, be structured as Up-Grade, on any control section, thus operate on equipments already available; a great saving when one considers that the power section is the most expensive part, of any other conversion device.

DETAILED DESCRIPTION OF THE PREFERRED EMBODIMENTS

First of all, we point out, that the control/correction system "has-to-aim" to work with the higher possible dynamics; from this point of view, the maximum possible is to trace the harmonic components of a period, and to make the relevant corrections, already in the subsequent period; and all that is certainly possible, if we structure appropriate processing systems As regards our prototype, whose target is only to test the system's functioning, we preferred to work on three periods, connecting period/action as it is shown in Table-D (a period of data survey, another of processing, and another of correction). Even under these circumstances, we got some good results; anyway, we intend to increase this correction dynamics, for the models of production in series, (that regards the device's features, but it doesn't regards its' functional conception, and thus the draft of this patent).

Figure 6:
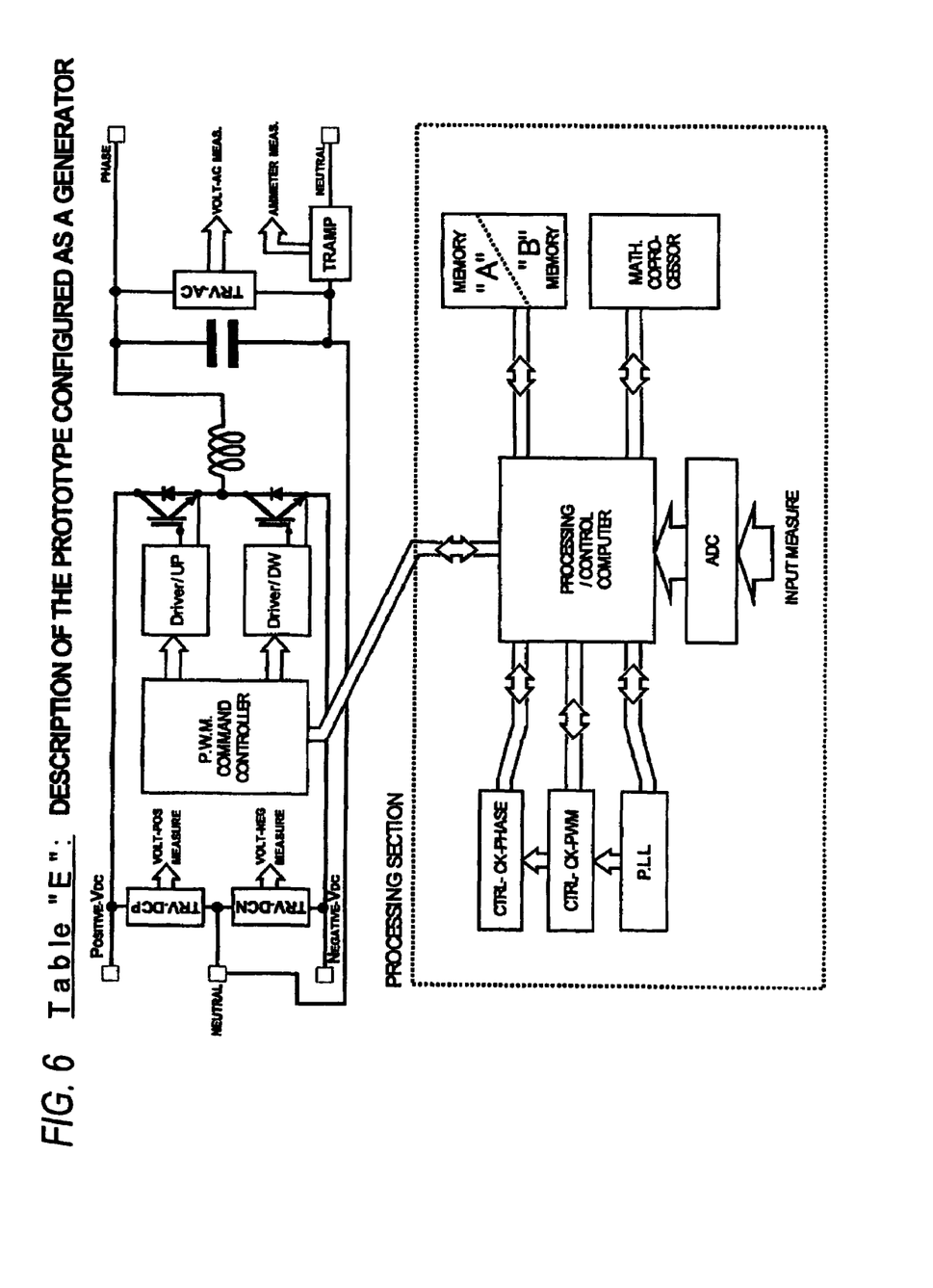
FIG. 6 is a view illustrating a prototype configured as a generator in the inventive system.

To give prominence to the working cycle of the prototype we have worked out, we arranged the diagram of Table-E; following it one can points out the various circuits and their correlations.

The upper part of th diagram, shows the power section, and, as w can verify, it is quite similar to a normal PWM conversion section in alternating current so the elements that the diagram reports, are:

The measure transducers for the voltage and current parameters (in the alternating and continuous section);

The power section with IGBT and integrating filter;

The Drivers of command/control, for both the IGBT connected to the positive (Driver-Up), and for the IGBT connected to the negative (Driver-Dw).

The lower part of the diagram, shows the "Control Section"; this is the part that points out the functional conception of the device, that we can describe as follows (from now on, we use "PCC" referring to the Processing/Control Computer):

The network voltage (together with other measurements), goes in the "PCC", which tests Its acceptance-parameters (limits of frequency/voltage/phase that the system can satisfy).

If the acceptance-parameters obey to the project's rule, the "PCC" activates the PLL circuit (Phase Locked Loop), being characterized by a phase angle detector, and by a VCO (Voltage Controlled Oscillator), it generates the most convenient frequency, so that the PWM counter (Ctrl-Ck-Pwm) and the phase counter (Ctrl-Ck-phase), can go on in a completely synchronous mode, with the frequency and the phase of the network input This circuit is really Important because, the precision/stability it reaches, is a parameter which defines the device performance/quality as a whole. It's plain that, to correct, for example, the ninth harmonic, one needs a much more steady system than the harmonic component that has to be corrected (In that case nine times bigger than the fundamental).

From this PLL circuit, we get both the PWM commands (Ctrl-Ck-Pwm), and the command that Informs the MicroComputer of the Step-of-phase, that the period has reached (Ctrl-Ck-Phase).

This circuit can be structured with various functional frequencies, since the sole constraint it imposes, is to have "the reset of the phase counter" perfectly synchronized with "the completion of th period on the external network". It's clear that the larger Is the number of samplings selected (both as PWM, and as Phase), the better are the performances that the device offers. We have to take this choice carefully, considering th circuit as a whole; In fact: Increasing the sampling (thus the PWM frequency), the power circuits lower the efficiency; on the contrary, the cost of the electronics of control rises up, because of the advanced performances.

At the same time of the PLL section, and in a perfectly synchronic mode, the "PCC" activates a conversion analog-to-digital circuit, that samples the network voltage, and stores the different amplitudes and angles of the period in which they are obtained.

This parameter is also very important because the larger is the number of the measurement carried out, the less is the error of the system In the processings; but we still have to considerate that, the larger is the number of the measurements, the more we have complex processings; so it Is necessary to have a processing faster/qualified system, thus more expensive.

The "PCC" can be structured in various ways, but-it has to operate according to three different elaborative concepts:

It has to make the sampling of the data and memorize them, correlating them to the various phase sequencies, which they belong to;

It has to realize the processing of the FFT, of the FFT[1] and of the ELB-1/2/3, as it is shown in Table-D;

It has to arrange the commands of the "PWM-Command-Controller", as Table-E shows;

A planning fact that can be realized using only a microprocessor (and make it working for the part to the various processing actions, with Interrupts/trap techniques), or assigning "parallel-architectures" assign "PCC" in modo distribuito.

In the realized prototype, we preferred to use three microprocessors working at the same time (as regards the mass-production, we think it's necessary to resort to a "silicon foundry", and structure the "PCC" on "dedicated-chip"), and assign them the processing phases as follows:

A first Microprocessor controls the conversion of the different measures, the stability of the network in frequency/phase, and memorizes in a memory area the value of the network voltage, together with th phase angle with which the measure has been obtained;

A second Microprocessor elaborates the signals as Table-D shows (see the sections FFT, ELB-1, ELB-2). In that case, we let the Microprocessor intercat with a Mathematical-Coprocessor, and using the algorithm of the DFT (Discrete Fourier Transform), in order to highly reduce the processing times (we believe, in that case, that for the mass-production it is necessary to use a Mathematical-Coprocessor appropriately structured);

Finally, the third Microprocessor carries out the processings, as it is shown in Table-D (see the sections ELB-3, FF$^1$), and realizes the commands that has to be sent to the Up/Dw/Driver. Also in that case we let the Microprocessor interact with a Mathematical-Coprocessor, in order to reduce the processing times (and, also in that case, we believe that for the mass-production it is necessary to use a Mathematical-Coprocessor appropriately structured). We also point out that this section, in order to elaborate the commands that has to be assigned to the PWM-Driver, strictly interacts with the phase controller (Ctrl-Ck-Fase signal) and with the PWM controller (Ctrl-Ck-PWM signal). Therefore, its working is structured as follows:

After carrying out the DFT$^1$, the circuit knows the various harmonic components that need to be compensated; since it has the steps of phase of the fundamental frequency (Ctrl-Ck-Phase), it can obtain the contribution that the various harmonic components give, for each PWM-step activated;

Besides, correlating with the PWM reference signal (Ctrl-Ck-PWM), it can perfectly synchronize the commands and avoid any possible phenomenon of instability(low-Jitter).

Last section is composed of the PWM-Controller and the Up/Dw/Driver, whose target is to guide the power circuits, with the commands that the processing section assign to them.

The sampling theorem says that, the strictly-limited-band-signals are represented by their own samples, when the Nyquist condition (fsamp≧2fmax) is satisfied: the time-domain/frequency-domain duality, suggests that a similar result has to be valid for the spectrum of the limited signals. As regards the sequencies, with a finite duration, with this suggestion we reach an alternative spectrum representation, known as Discrete Fourier Tranform (DFT).

Figure 7:
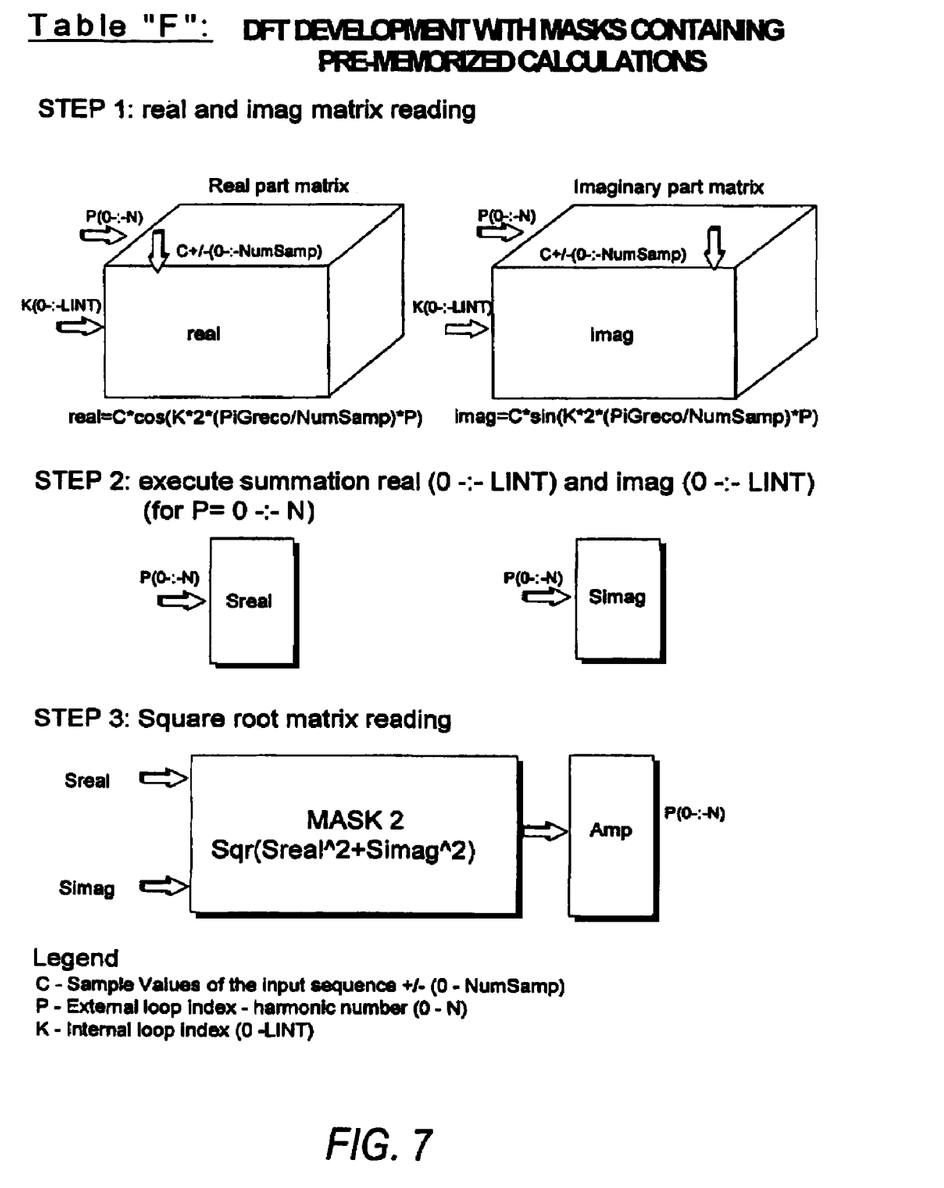
FIG. 7 is a view illustrating a DFT development with masks containing pre-memorized calculations.

The interest for this kind of tranform is due to the existance of algorithms that are particularly efficient for its evaluation, known as FFT algorithms (Fast Fourier Trasform); they allow us to calculate their spectrum very quickly. In order to experiment our prototype we have prepared a matrix whose calculations are pre-elaborated (Table-F shows their structure); this matrix points out, according to the following input data:

The number of the samples per period (Num-Samp);
The number of the quantization levels (ADC);
The number of the harmonic that has to be calculated(N).
The system realizes the following three processing steps:
A first step to evaluate the real and imaginary components (box-real and box-imag of the Table-F).
A second step to realize the sum of the real and imaginary parts obtained(box-Sreal and box-Simag of Table- F).
A third step, with which we obtain the amplitude of each harmonic, from the Sreal and Simag values obtained.
It is, as one can see, a estremely quick method, which is able to supply the new correction data, exactly when the analized period ends; therefore, it is a control dynamics that can be realized in "real-time", exeeding the scheme proposed in Table-D, where the period sequencies were: one of measurement, another of processing, and another of correction. And this is a further remarkable advantage of the dynamics system and of the control/correction it offers.

The invention claimed is:

1. An electric control system, comprising:
a pulse width modulated inverter;
an electricity distribution network, wherein said pulse width modulated inverter is connected in parallel to the electricity distribution network for correcting or minimizing a voltage total harmonic distortion of the distribution network;
a sampler of the voltage of the electricity distribution network for obtaining samplings of the distribution network, wherein said sampler comprises an analog-to-digital converter;
a phase locked loop circuit that supplies a phase value of a period under examination; and
a storage system for coupling the various samplings with the phase value obtained by the phase locked loop circuit.

2. An electrical control system according to claim 1, wherein the pulse width modulated inverter is a DC/AC inverter, wherein the inverter is inserted in an electrical generator connected in parallel to the electricity distribution network.

3. An electrical control system according to claim 1, wherein the pulse width modulated inverter is an AC/DC inverter, wherein said inverter is inserted in a load connected in parallel to the electricity distribution network.

* * * * *